United States Patent [19]

Jondelius

[11] Patent Number: 5,064,162
[45] Date of Patent: Nov. 12, 1991

[54] PORTABLE-TELEPHONE MOUNTING BRACKET

[76] Inventor: Björn Jondelius, Upplandsgatan 84, 113 44 Stockholm, Sweden

[21] Appl. No.: 459,660

[22] Filed: Jan. 2, 1990

[30] Foreign Application Priority Data

Jun. 20, 1989 [SE] Sweden .................... 8902234

[51] Int. Cl.⁵ ............................................. F16M 13/00
[52] U.S. Cl. ...................................... 248/548; 248/300;
248/176; 248/225.1; 248/900; 248/909;
224/42.45 R
[58] Field of Search .............. 248/225.1, 300, 150,
248/548, 909, 900, 176; 224/42.45 R, 42.42

[56] References Cited

U.S. PATENT DOCUMENTS

| | | | |
|---|---|---|---|
| 2,522,205 | 9/1950 | Anderson | 224/42.45 R |
| 3,115,825 | 12/1963 | Mommsen | 248/300 X |
| 4,283,034 | 8/1981 | Sheehan | 248/909 X |
| 4,629,153 | 12/1986 | Marcam | 224/423.45 R X |
| 4,723,746 | 2/1988 | Gould et al. | 248/300 X |
| 4,765,581 | 8/1988 | Wallace et al. | 248/311.2 |
| 4,767,092 | 8/1988 | Weatherly | 248/311.2 |
| 4,903,872 | 2/1990 | Hendricksen et al. | 224/42.45 R X |

Primary Examiner—Alvin C. Chin-Shue
Attorney, Agent, or Firm—Nies, Kurz, Bergert & Tamburro

[57] ABSTRACT

A portable-telephone mounting bracket for installation in vehicles, primarily cars, said bracket having an elongated configuration and including one or more bends and made of a sheet-like material, preferably a plastics material, and which bracket includes a flat part (5) from which an upper arm (6) and a lower arm (7) extend, the outer ends (8, 9) of respective arms being intended to be fitted into a slot in the vehicle instrument panel or in the air intake located on the instrument panel, or at some other location, such that the mounting bracket can be secured to the instrument panel by means of the aforesaid ends, and the flat part of the mounting bracket being intended to support the receiver-cradle of the portable telephone. The invention is characterized by grooves (13-15) which are located at least adjacent the bends (2-4) and which extend along the length of the bends, and is further characterized in that the grooves (13-15) have a depth which equals at least one-fourth the thickness of the sheet-like material.

6 Claims, 1 Drawing Sheet

PORTABLE-TELEPHONE MOUNTING BRACKET

BACKGROUND OF THE INVENTION

The present invention relates to a mounting bracket by means of which portable telephones can be mounted in motor vehicles, primarily cars.

There are at present available many types of mounting brackets which are of elongated configuration, provided with bends and made of sheet material, preferably plastic material, such as ABS-plastic. The design of the various mounting brackets available is determined by the configuration of the interior design of the vehicle for which the mounting bracket is intended. Actually, in the majority of cases the design and configuration of the instrument panel or dashboard is paramount in determining the configuration of the mounting bracket.

Such mounting brackets include a flat part, from which there extend an upper and a lower arm. The ends of the arms are intended to be fitted into slots in the instrument panel, or into the air-intake located on top of the instrument panel, such as to enable the mounting bracket to be secured by the ends of said arms. The cradle which supports the telephone handset or receiver is secured to the flat part of the mounting, with the aid of screws or like fasteners.

When installed in the vehicle, a mounting bracket of this kind will protrude outwardly from the instrument panel, and the bracket is generally fitted relative close to the driving seat, so that the handset is within easy and comfortable reach of the driver. The cradle and handset, or telephone receiver, themselves protrude from the mounting bracket, in towards the vehicle interior.

Vehicle installations such as these present, to some extent, a hazard to personal safety within the vehicle. In the case of some vehicle models, it is possible to fit the mounting bracket, together with the telephone set, so as not to encroach on vehicle safety, whereas in the case of other vehicle models, the installation of such telephone mounting brackets presents a significant hazard to safety within the vehicle.

SUMMARY OF THE INVENTION

The present invention is a portable-telephone mounting bracket which is constructed so as not to impair safety within the vehicle to any appreciable extent, despite those instances when the mounting bracket is fitted in a position which is unfavourable from the aspect of safety.

The present invention thus relates to a bracket which is intended for supporting portable telephones in vehicles, primarily cars, and which has an elongated configuration and includes one or more bends, and which is made from sheet material, preferably a plastics material, and which includes a flat part from which there extend an upper and a lower arm, the outer ends of which are intended to be fitted into a slot in the instrument panel or into the air intake above said panel or in some other place, such that the mounting bracket can be held securely by the ends of said arms, and the flat part of which mounting bracket is intended to support the telephone cradle, said mounting bracket being characterized by grooves which are located at least adjacent said bends and which extend along the length of said bends; and in that the grooves have a depth which corresponds at least to one-quarter of the material thickness of the sheet-like material.

BRIEF DESCRIPTION OF THE DRAWING

The invention will now be described in more detail with reference to exemplifying embodiments thereof and also with reference to the accompanying drawings, in which.

DESCRIPTION OF THE DISCLOSED EMBODIMENT

Figure 1:
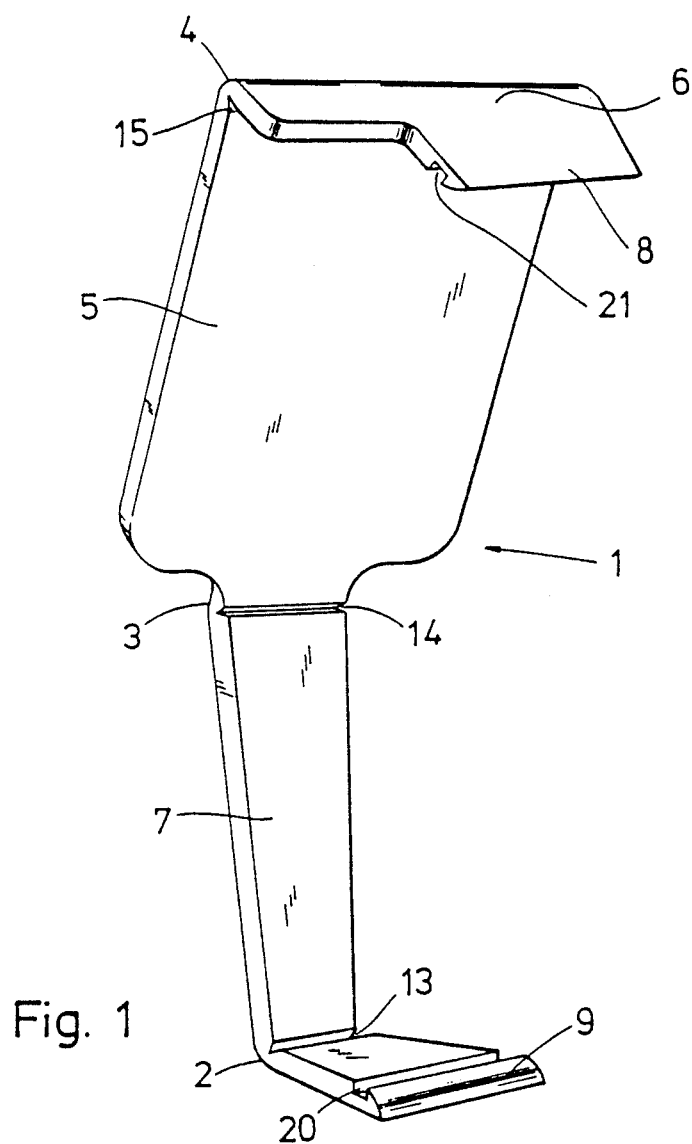
FIG. 1 is a perspective view of an inventive mounting bracket, as seen from the rear thereof.

FIG. 1 illustrates by way of example a mounting bracket which is intended for installation in a Ford Sierra, 1987 model. Because of the different configurations of the various instrument panels, or dashboards, and also because the possibilities of securing such brackets vary considerably from vehicle model to vehicle model, many different types of mounting brackets are to be found. However, all of the various mounting brackets available have basically the same design, or essentially the same design, and consequently the present invention will be described here with reference to the exemplifying mounting bracket illustrated in FIG. 1.

The illustrated mounting bracket 1 has an elongated configuration and includes bends 2-4. The bracket is made of sheet material, preferably a plastic material, for instance ABS-plastic. The bracket includes a flat part 5, from which an upper arm 6 and a lower arm 7 extend. The other ends 8, 9 of respective arms 6, 7 are intended to be fitted into a slot located in the instrument panel 10, or in the airtake located on top of the instrument panel, or in some other fastening facility, so that the bracket 1 can be secured to the instrument panel by means of said ends. The flat part 5 of the mounting bracket is intended to support a cradle which in turn supports the handset 12 or telephone receiver, said cradle being secured to the flat part 5 of said bracket.

In accordance with the invention, grooves or channels 13-15 are provided at least in regions adjacent the aforesaid bends and extend along the lengths of said bends. The grooves have a depth which is equal to at least one-quarter of the thickness of the sheet-like material. The aforesaid grooves may extend along the whole length of a respective bend or, alternatively, may only extend along a major part of said bends.

According to one preferred embodiment of the invention, the depth of grooves 13-15 is equal to at least one-third of the thickness of the sheet-like material.

Figure 2:
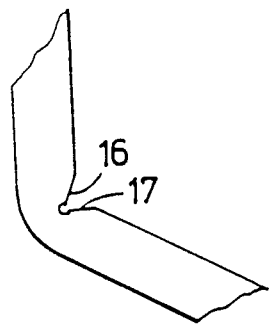
FIG. 2 illustrates a section of the mounting bracket in larger scale.

According to a further preferred embodiment of the invention, the side walls 16, 17 defining the grooves together define an angle of at least about 90°, as illustrated in FIG. 2, this figure showing the groove 13 of FIG. 1 in larger scale and from one side of the groove.

According to another preferred embodiment of the invention, the grooves (13-15) have a rounded bottom, as illustrated in FIG. 2. This avoids the presence of a sharp-cornered groove bottom along which cracks may otherwise be likely to form.

The aforesaid grooves form weakenings in the mounting bracket which function as hinges when the bracket is subjected to greater forces than those normally applied when handling the telephone. By greater forces is meant forces in the order of magnitude of those to which the bracket would be subjected in the event of a collision between the vehicle and some other object. In such cases, the mounting bracket is not only subjected to forces deriving from its own weight, but primarily to all forces which relate to the weight of the cradle and associated handset.

Figure 3:
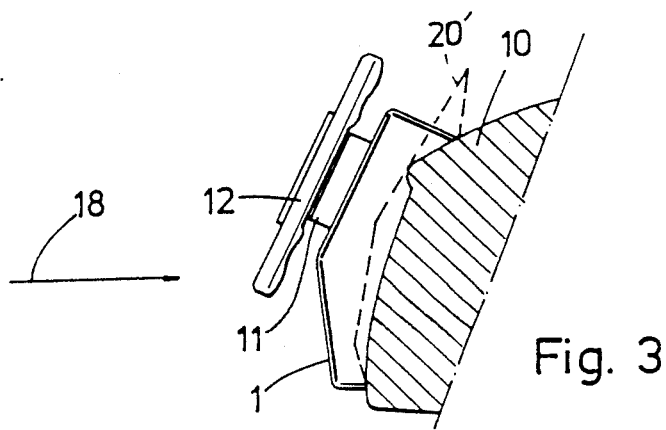
FIG. 3 illustrates the functional aspect of the inventive mounting bracket and shows the bracket from one side, while supporting a cradle and telephone handset.

By forming the grooves such that the groove-defining walls subtend a relatively large angle therebetween, those parts of the mounting bracket located on either side of the groove can be bent towards or away from one another through some considerable extend, as shown by dotted line 20' in FIG. 3, without the bracket breaking in the region of the groove. It is desirable that the mounting bracket will not disintegrate in the event of a collision, since broken pieces of plastic material would then fly around in the vehicle interior.

On the other hand, it may be beneficial for the whole of the mounting bracket, together with cradle and handset, to loosen from its securing point and be ejected from the vehicle in the event of a collision. The majority of modern vehicles are constructed so that when involved in a head-on collision of given impact force, the windscreen will loosen and leave the vehicle. The fact that the mounting bracket will also loosen and leave the vehicle in a forward direction in such cases is also an advantage. In the case of less forceful collisions, it suffices for the mounting bracket to yield to the force exerted on the telephone by a vehicle passenger, for instance.

FIG. 3 illustrates schematically and in cross-section an instrument panel 10 on which a mounting bracket 1, shown in full lines, is secured. The mounting bracket supports a telephone cradle 11 and a handset or telephone receiver 12. In the FIG. 3 illustration, the mounting bracket 1 has been subjected to a heavy force in the direction of the arrow 18, the mounting bracket will collapse to the state 20', illustrated in broken lines, owing to the hinge effect of the aforesaid grooves. As a result, the portable telephone will no longer project in towards the interior of the vehicle as it did at the beginning, but will essentially conform to the shape of the instrument panel 10. This considerably enhances the safety of the vehicle occupants in comparison to a mounting bracket which remains intact.

The mounting bracket of the FIG. 1 embodiment has two grooves 20, 21 which are intended to co-act with slots in the vehicle instrument panel, such as to enable the bracket to be secured to said panel. As will be seen from FIG. 3, when the mounting bracket collapses, the lower end 9 of the arm 7 will straighten in relation to arm 7 and therewith allow the terminal end 9 to move out of engagement with the slot in the instrument panel with which it co-acts. This also applies to the terminal end portion 8 of the upper arm 6 relative to the slot with which arm 6 co-acts. Thus, it is possible in accordance with the present invention to design a mounting bracket which will loosen when subjected to a predetermined force.

As before mentioned, a large number of mounting brackets of mutually different configuration are to be found. Consequently, it is advantageous, in some cases, to also provide the mounting bracket with grooves along its planar parts, i.e. not only adjacent the bends located in the bracket, such as to cause the bracket to collapse to a desired configuration, or alternatively to loosen, when subjected to a given force.

The inventive mounting bracket can, of course, be modified with respect to the positioning and configuration of the grooves.

The invention shall not therefore be considered to be limited to the aforedescribed exemplifying embodiments, since modifications can be made within the scope of the following claims.

I claim:

1. A portable-telephone mounting bracket for installation in vehicles, said bracket having an elongated essentially upright configuration and including one or more bends at lateral bend lines and being made of a flat sheet-like material, said bracket including a flat intermediate part with front and rear faces (5) from which an upper arm part (6) and a lower arm part (7), each extend rearwardly from a different said lateral bend line, the terminal ends (8, 9) of respective arm parts being beveled and having lateral shapes providing attachment appendages adapted to be fitted into and thereby secured in associated slots in the vehicle instrument panel, such as in the air intake located on the instrument panel, so that the mounting bracket can be secured to the vehicle instrument panel by means of said ends, and the intermediate flat part of said mounting bracket providing support for the receiver-cradle of a portable telephone, and wherein lateral grooves (13-15) are located in said sheet material at least adjacent said bends (2-4) and extending at least partially along the length of said bends; said grooves (13-15) having a depth which equals at least one-quarter the thickness of the sheet-like material to thereby provide weakened bend lines which enable said bend lines to function as hinges between said intermediate flat part and parts of said upper and lower arm parts and permit bending between said intermediate part and said upper and lower arm parts when said bracket is subjected to abnormal forces in a direction from the front face toward the rear face of said bracket which will force the bracket parts to fold on said bend lines and move toward and upward relative to the vehicle panel resulting in a fail-safe release of said bracket and attachment appendages from said slots in said vehicle panel.

2. A mounting bracket according to claim 1, wherein the grooves (13-15) have a depth which equals at least one-third of the thickness of said sheet-like material.

3. A mounting bracket according to claim 1, wherein side walls (16, 17) defining said grooves (13-15) form an angle of at least about 90° therebetween.

4. A mounting bracket according to claim 1, wherein each groove (13-15) has a rounded bottom.

5. A portable-telephone mounting bracket as defined in claim 1, wherein said sheet material is made from a plastics material.

6. A portable-telephone mounting bracket as defined in claim 5, wherein said plastics material is an ABS plastic.

* * * * *